(12) United States Patent
Linebach et al.

(10) Patent No.: US 7,344,202 B2
(45) Date of Patent: Mar. 18, 2008

(54) SYSTEM AND METHOD FOR DEALING WITH GROUND FAULT CONDITIONS THAT CAN ARISE IN AN ELECTRICAL PROPULSION SYSTEM

(75) Inventors: Mark Alan Linebach, McKean, PA (US); Ajith Kuttannair Kumar, Erie, PA (US); Bret Dwayne Worden, Union City, PA (US); Jeremy T. McGarry, Erie, PA (US); Scott Joseph Zarella, Erie, PA (US)

(73) Assignee: General Electric Company, Schenectady, NY (US)

( * ) Notice: Subject to any disclaimer, the term of this patent is extended or adjusted under 35 U.S.C. 154(b) by 274 days.

(21) Appl. No.: 11/126,801

(22) Filed: May 11, 2005

(65) Prior Publication Data

US 2006/0255656 A1   Nov. 16, 2006

(51) Int. Cl.
*B60T 8/34* (2006.01)
(52) U.S. Cl. .................... 303/113.2; 702/58; 361/42; 361/63; 324/509; 324/522
(58) Field of Classification Search ............. 303/113.2; 702/57, 58, 59; 361/42, 43, 44, 45, 63; 324/500, 324/509, 510, 511, 512, 522
See application file for complete search history.

(56) References Cited

U.S. PATENT DOCUMENTS

| 5,508,872 | A | 4/1996 | Khoo et al. |
| 5,528,445 | A | 6/1996 | Cooke et al. |
| 5,710,777 | A | 1/1998 | Gawne |
| 5,768,079 | A | 6/1998 | Buell |
| 5,872,457 | A | 2/1999 | Williams |
| 5,877,926 | A | 3/1999 | Moisin |
| 5,945,802 | A | 8/1999 | Konrad et al. |
| 5,946,172 | A | 8/1999 | Hansson et al. |
| 5,982,593 | A | 11/1999 | Kimblin et al. |
| 5,990,686 | A | 11/1999 | Vokey et al. |
| 6,002,563 | A | 12/1999 | Esakoff et al. |
| 6,081,122 | A | 6/2000 | McCary |
| 6,288,372 | B1 | 9/2001 | Sandberg et al. |
| 6,318,160 | B1 | 11/2001 | Bessler |
| 6,421,618 | B1 | 7/2002 | Kliman et al. |

(Continued)

*Primary Examiner*—Pam Rodriguez
(74) *Attorney, Agent, or Firm*—Carlos Hanze; Enrique J. Mora; Beusse Wolter Sanks Mora & Maire, P.A.

(57) ABSTRACT

A method and system is provided for detecting and performing diagnostics regarding an incipient ground fault that may occur in an electrical propulsion system of a traction vehicle, such as a locomotive, transit vehicle, or off-highway vehicle. The method allows providing a first ground connection for the electrical propulsion system. This first ground connection forms a grounding path generally used by the electrical propulsion system during normal operation. The method further allows providing a second ground connection for the electrical propulsion system. This second ground connection forms a grounding path selectively usable in lieu of the first ground connection. A control strategy is defined for switching between the first ground connection and the second ground connection. A respective leakage current associated with at least one of the first and second ground connections may be monitored. Switching between the first and second ground connections may be controlled based on the monitored leakage current associated with at least one of the first and second ground connections.

10 Claims, 3 Drawing Sheets

U.S. PATENT DOCUMENTS

| | | |
|---|---|---|
| 6,794,879 B2 | 9/2004 | Lawson et al. |
| 6,798,210 B2 | 9/2004 | Goodrich et al. |
| 7,035,065 B2 * | 4/2006 | McNally et al. ............. 361/42 |
| 2002/0145842 A1 * | 10/2002 | Kumar et al. ............. 361/93.9 |
| 2004/0162696 A1 | 8/2004 | Kumar |
| 2004/0227520 A1 | 11/2004 | Saunders et al. |

* cited by examiner

SYSTEM AND METHOD FOR DEALING WITH GROUND FAULT CONDITIONS THAT CAN ARISE IN AN ELECTRICAL PROPULSION SYSTEM

FIELD OF THE INVENTION

The present invention is generally related to electrical propulsion systems for traction vehicles, and, more particularly, to a system and method for detecting and dealing with ground fault conditions that can arise in the electrical propulsion system of a traction vehicle.

BACKGROUND OF THE INVENTION

Locomotives and transit vehicles, as well as other large traction vehicles used for heavy haul applications (off-highway trucks), commonly use an electrical propulsion system that includes various high power electrical components, such as generators, rectifiers, converters, traction motors, dynamic braking grids, cooling blowers, and the like. These components may fail over time due to various reasons, one of them being electrical grounds that may be caused by insulation degradation. For example, locomotives may operate in environments subject to varying conditions, such as those causative of freezing and thawing, which can degrade an electrical insulation exposed to such varying conditions by causing cracks. The propulsion system of a locomotive has many insulated windings, and excessive leakage current could develop over time due to various factors, such as aging, moisture, abrasions, dirt build-up and the like. This is especially true for the traction motors since moisture often gets into these components because of their location and exposure to relatively harsh environmental conditions. Failures due to excessive electrical leakage currents in an electrical system of locomotives are a leading cause of system shutdowns and locomotive mission failures.

Leakage current detectors have been used on many kinds of electrical equipment to protect the equipment from damage that could arise in the presence of a large electrical current and/or to protect personnel from injury, and there may be substantial industrial background on leakage current monitoring by techniques used in electrical utility or industrial applications. Ground faults may occur as a result of a fault in any of a number of different system components. In the context of a locomotive, such components by way of example can include the propulsion drive system, batteries, and auxiliary equipment. Within the propulsion drive system, ground faults can occur in one or several components, which include generator, rectifier, cabling, traction motor, dynamic brake resistor, and blower motor.

A known difficulty in dealing with ground conditions in a locomotive is that many of such conditions may be transitory in nature. Often when a ground fault condition occurs, the affected portion of the electrical system is deactivated, and the locomotive is scheduled for repairs. However, once the locomotive is shopped for repairs, the system may no longer exhibit abnormal grounds and the maintenance personnel cannot identify the source of the fault. This is often because the excessive leakage current is caused by moisture in the electrical components. By the time the locomotive is shopped, the moisture has dried out, thus eliminating the high leakage currents. The amount of moisture that is able to penetrate the insulation system and result in high leakage currents often depends in part on the condition of the insulation system. A healthy system experiences relatively small change in leakage current as a result of changing moisture conditions, whereas a system with degraded insulation may experience large changes in leakage current that is moisture dependent.

In view of the foregoing considerations, it is desirable to have early warning of leakage current development, (i.e., an incipient ground fault) in the electrical propulsion of the locomotive so that action may be taken before there is a locomotive disabling failure. More particularly, it would be desirable that such an action enables continued operation of the locomotive propulsion system so that the locomotive can fulfill a mission and be able to return on its own power to a locomotive service shop for a thorough check and repair.

It would be further desirable to have the ability to determine in real time the specific equipment that causes the incipient ground fault, as that condition occurs, so that service personnel can retrieve at a later time that information and be able to focus on that specific equipment once the locomotive eventually arrives to the locomotive service shop, without trying to mimic the environmental conditions that may have contributed to the occurrence of the incipient ground fault or without having to spend valuable resources and time on troubleshooting fault-free equipment.

BRIEF DESCRIPTION OF THE DRAWINGS

These and other advantages of the invention will be more apparent from the following description in view of the drawings that show.

DETAILED DESCRIPTION OF THE INVENTION

Figure 1:
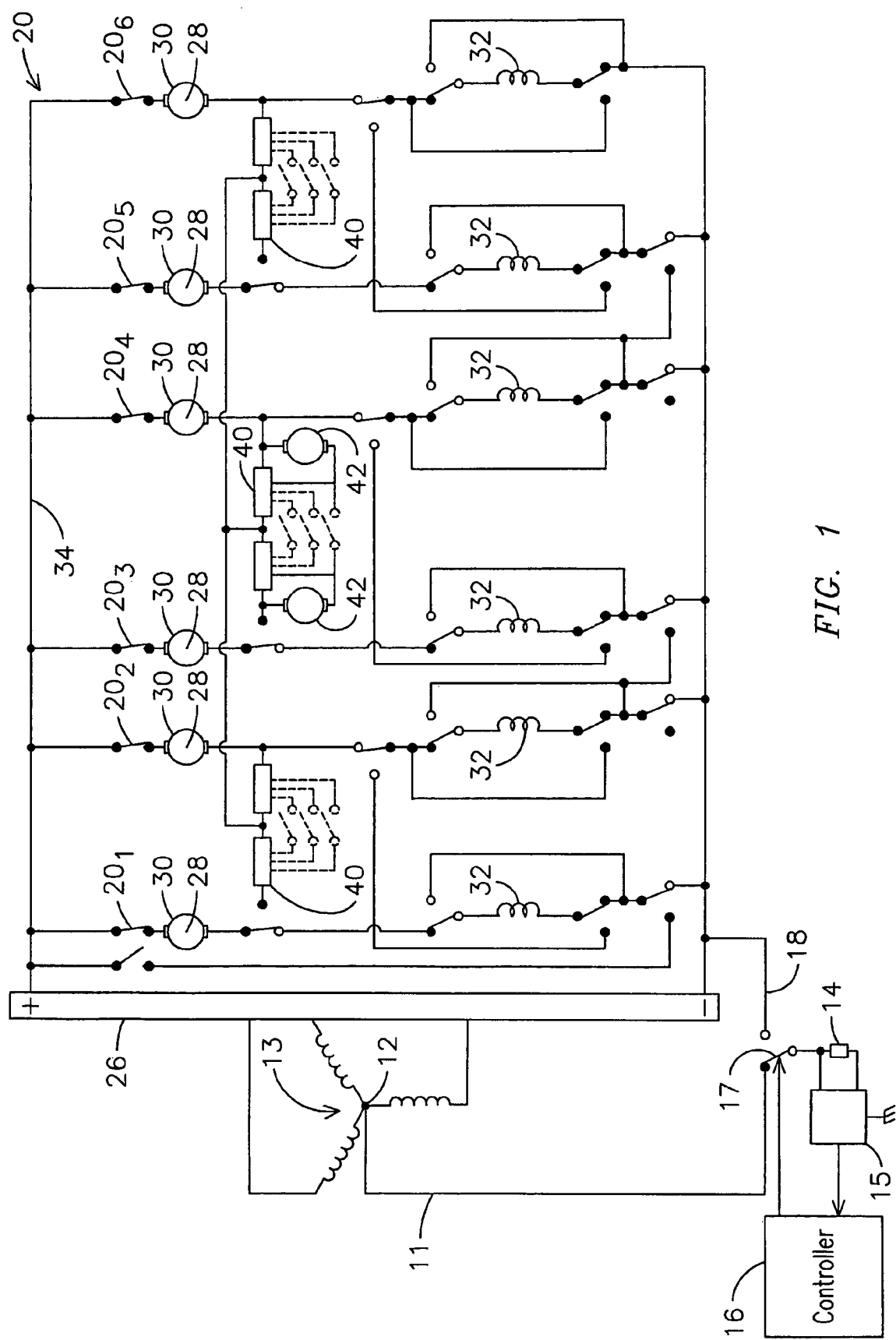
FIG. 1 is a circuit diagram of an exemplary locomotive electrical propulsion system configured to operate in a "motoring mode" and embodying aspects of the present invention.

FIG. 1 is a schematic circuit diagram of a locomotive electrical system that, for purposes of example, comprises a propulsion system 20, such as may be configured for a typical DC (direct current) drive locomotive. Propulsion system 20 comprises a three-phase electromotive machine 13 (which may comprise a motor or generator, for example, and in the embodiment of FIG. 1 comprises a wye-connected generator 13 driven by a prime mover, such as a diesel engine (not shown). Tractive effort may be controlled by varying the excitation current, hence the output voltage, of machine 13. The AC (alternating current) voltage from generator 13 is then rectified by a rectifier 26 to produce DC voltage. Traction motors 28 are usually series field DC traction motors each with an armature 30 and a field winding 32. There are typically four or six traction motors in a locomotive propulsion drive system 20, depending on the application, connected in parallel to a DC bus 34 across the rectified DC source.

FIG. 1 further illustrates braking grids 40, made up of resistors as may be used during dynamic braking of the locomotive for dissipating electrical energy into thermal energy. One or more blower motors 42 are also connected to the DC bus 34. The blower motors may have multiple speeds that provide adjustable cooling air circulation to the braking grids 40 and traction motors 28. Although the description of monitoring leakage current contained herein is described in the context of a propulsion system for a typical DC drive locomotive, it is contemplated, and one skilled in the art will readily understand, that the techniques described below are also applicable to AC drive locomotive systems, as the invention is not limited to any particular type of electrical propulsion system. It is further contemplated that aspects of the present invention are applicable not just to locomotives but to any type of large, traction vehicle equipped with an electrical propulsion system, such as transit vehicles, and off-highway vehicles.

FIG. 1 illustrates a first ground connection 11 for electrical propulsion system 20. This first ground connection forms a grounding path (e.g., from a neutral node 12 in generator 13 to the locomotive frame (e.g., ground)) that may be used by the electrical propulsion system during normal operation for electrical grounding purposes, e.g., to pass leakage current. This first ground connection may be selected to increase detectability or visibility of an incipient ground fault in the propulsion system. For example, in the case where the first ground connection is a neutral node connection, then such node provides appropriate electrical visibility to the entire system with the understanding that one potential blind spot could occur in the generator at a point electrically proximate to (or at) the neutral point 12. Thus, a neutral node connection may be selected as the ground connection during normal operation (e.g., no ground fault suspected).

In one exemplary embodiment, leakage current may be monitored by a current monitor device 15 in parallel circuit with an impedance 14 (e.g., a 10 ohm resistor) and coupled to a controller 16 so that warnings, trips, or appropriate ground switching actions, as described in greater detail below, may be enabled when the leakage current reaches a predetermined leakage current limit. Although the description herein generally refers to leakage current, it will be appreciated that the current is proportional to leakage voltage, thus either current or voltage can be used as a leakage signal.

In accordance with aspects of the present invention, in the event the level of leakage current exceeds the leakage current limit, a relay 17 is actuated in response to a switching signal from controller 16 to switch the electrical propulsion system ground connection from the first ground connection to a second ground connection 18. This second ground connection preferably forms a grounding path at a relatively lower voltage than the voltage at the grounding path formed by the first ground connection.

The inventors of the present invention have innovatively recognized that providing this second ground connection can advantageously allow continued operation of the locomotive propulsion system so that the locomotive can fulfill a mission and, for example, be able to return to a locomotive service shop for performing any appropriate checks and repairs. Furthermore, use of the second ground connection, in lieu of the first ground connection, avoids the potential escalation of the incipient ground fault into a locomotive-disabling condition. The foregoing constitutes a significant advantage over known techniques since traditionally once an incipient ground fault condition (e.g., leakage current reaches a value in the order of 0.5 Ampere) is detected; the locomotive control system generally disables the propulsion system of the locomotive in view of the substantial damage that could occur to the equipment if such ground fault condition were to escalate into a fully developed ground fault where the value of the leakage current could potentially reach hundreds of amperes.

As exemplarily illustrated in FIG. 1, the second ground connection 18 is provided at the negative rail of the DC bus. It will be understood, however, that the second ground connection can be provided at either one of the first and second voltage rails of the DC bus, e.g., the positive or negative voltage rails. In general, one can select as the second ground connection any circuit node that provides a grounding path at a relatively lower voltage than the voltage at the grounding path formed by the first ground connection. It will be appreciated that the number of possible ground connection points need not be limited to two points.

As further shown in FIG. 1, electrical propulsion system 20 further comprises a plurality of contactors $20_1$-$20_6$ that may be individually set either in an electrically closed condition or in electrically open condition. When in the closed condition, a respective contactor is electrically coupled in circuit series with a respective one of the traction motors 28 to receive voltage from the DC bus.

In accordance with further aspects of the present invention, prior to switching to the second ground connection, one can perform a test sequence that allows determining which particular traction motor may be experiencing the incipient ground fault condition. For example, one may initially set contactor $20_1$ (or any of the other contactors $20_2$-$20_6$ in the propulsion system) from the closed condition to an open condition, and monitor a resulting transient signal response in the leakage current. The inventors of the present invention have recognized that a characteristic in the monitored transient signal response can be indicative of the presence of the incipient ground fault in connection with the respective traction motor associated with that contactor. For example, the change in the contactor from a closed condition to an open condition can induce an L di/dt reaction (e.g., current variation over time in the presence of an inductive impedance) in the affected circuit path (e.g., a traction motor). In particular, a circuit that causes the leakage current can create a noticeable spike on the leakage current signal when subjected to such L di/dt reaction. This spike may be readily recognized and appropriate fault information may be logged in memory against the particular traction motor.

It is noted that in reconnecting the ground reference point in any electrical system can have various effects. One is to shift the voltage potential relative to ground at various locations in the circuit. This can advantageously change the working voltage to which the insulation system(s) may be subjected. For example, a reduction in this working voltage can effectively reduce the electrical insulation needs and thus reduce the leakage current that could develop at any insulation degradation points. This reduction in current in turn can beneficially reduce the rate of damage accumulation at the fault point. This reduced rate of damage may allow for additional time to pass before reaching equipment functional failure. Also, this additional time may allow for any moisture related leakage paths to dry out.

In general, any electrical system with a fixed circuit ground location, and a ground fault detection technique limited to measuring leakage current at that fixed location, will lack the ability to detect grounds in the circuit which are at a relatively low potential with respect to the system ground point. For example, for the alternator neutral ground connection shown in FIG. 1, any insulation failures that occur at a circuit location electrically adjacent to (or at) the alternator neutral node 12 will not be detectable if one were to use the ground detection techniques of the prior art that rely on a fixed ground location. One advantageous aspect of the present invention is that having the ability to selectively switch the ground connection point to one or more electrically different locations essentially allows insulation failure detection anywhere in the circuit. That is, blind spots for detecting a ground fault can be essentially eliminated. For example, in one embodiment of the present invention, one may from time-to-time (even in the absence of any excessive current leakage indication) switch from the first ground connection 11 to the second ground connection 18. If no leakage current is detected at the second ground connection, then this would indicate no incipient ground faults anywhere in the circuit. If, however, one were to detect excessive leakage current at the second ground connection, then this would indicate an incipient ground fault electrically proximate to the neutral node 12. This switching action may be performed as desired for a given application (e.g., once weekly, every other week, etc.). Thus, this pro-active periodic switching of ground connections would allow for eliminating the possibility of an incipient ground fault that could develop at an electrically blind spot relative to the first ground connection. This also constitutes one example of ground fault location determination based on leakage current effects that may develop at the different ground connections for the circuit.

We will know describe another example of ground fault location determination based on leakage current effects that may develop at the different ground connections for the circuit. For example, assuming detection of leakage current occurs at the first ground connection and further assuming that upon switching to the second ground connection 18, leakage current also occurs at the second ground connection, then this would be indicative of an incipient ground fault electrically proximate to the positive rail of the DC bus. Thus, analysis of the monitored leakage current may be performed to obtain diagnostics information regarding the incipient ground fault, such as determining a likely location of the ground fault in the circuit.

It should be appreciated that if the voltage potential at a given circuit location is reduced, then the working voltage at other circuit locations may be affected, e.g., may result in higher working voltage at these other circuit locations. This higher voltage in turn can increase the insulation stress for these other locations of the circuit. Accordingly, these effects should be considered in the connection point switching strategy. For example, one way of addressing these effects may be performing a voltage deration (e.g., reduced generator excitation) or reduced periods of operation could be called for while operating at these higher potentials. For example, for the circuit embodiment illustrated in FIG. 1, when the ground connection is switched from the neutral node 12 to the negative DC bus, the voltage relative to ground can increase significantly at the neutral node and also at the traction motor armature. For this embodiment, the voltage drop across the motor field is relatively low compared to the drop across the armature 28. In general, most circuit architectures would favor a primary ground connection point to be used during healthy circuit conditions. A secondary ground connection point may be switched to for diagnostic purposes (e.g., increasing the voltage at various circuit locations).

As noted above, diagnostics information can be obtained from effects that may occur in the leakage current as the system ground connection point is switched from one point to another. Generally, if leakage current decreases (for a given system voltage level) then the ground fault itself is likely at a location which experiences a potential reduction as a result of the connection switch.

In the embodiment of FIG. 1, the contactors and associated switchgear are shown in a "motoring" configuration. In this embodiment, a typical maximum voltage across the series connection traction motors is about 1250 volts DC. Usually just about 15 to 30 DC volts will drop across the main field (note that resistance and/or voltage drop varies with winding temperature). This means that most of the DC bus voltage will drop across the armature 28 of the traction motors. If the generator neutral is the ground point, both the armature and fields of the traction motor will see peak phase voltage relative to ground. If the ground connection is switched to a location electrically proximate to the negative bus then the fields (main and commutating) will see a reduction in working voltage to ground to about 20-30 VDC while the armature will see approximately twice phase voltage. In this case, the alternator winding may also have to withstand approximately twice phase voltage to ground at its most extreme endpoints. It has been historically found that the DC traction motors tend to experience insulation failure in its main or commutating field winding more often than in its armature winding. This may be due to various reasons including moisture retention in the traction motor frame and other factors. In view of the foregoing characteristics regarding typical location of insulation failures, a ground connection switch as described herein has concomitant practical advantages for this exemplary application, although it should be understood that such advantages are not limited to this exemplary application.

Figure 2:
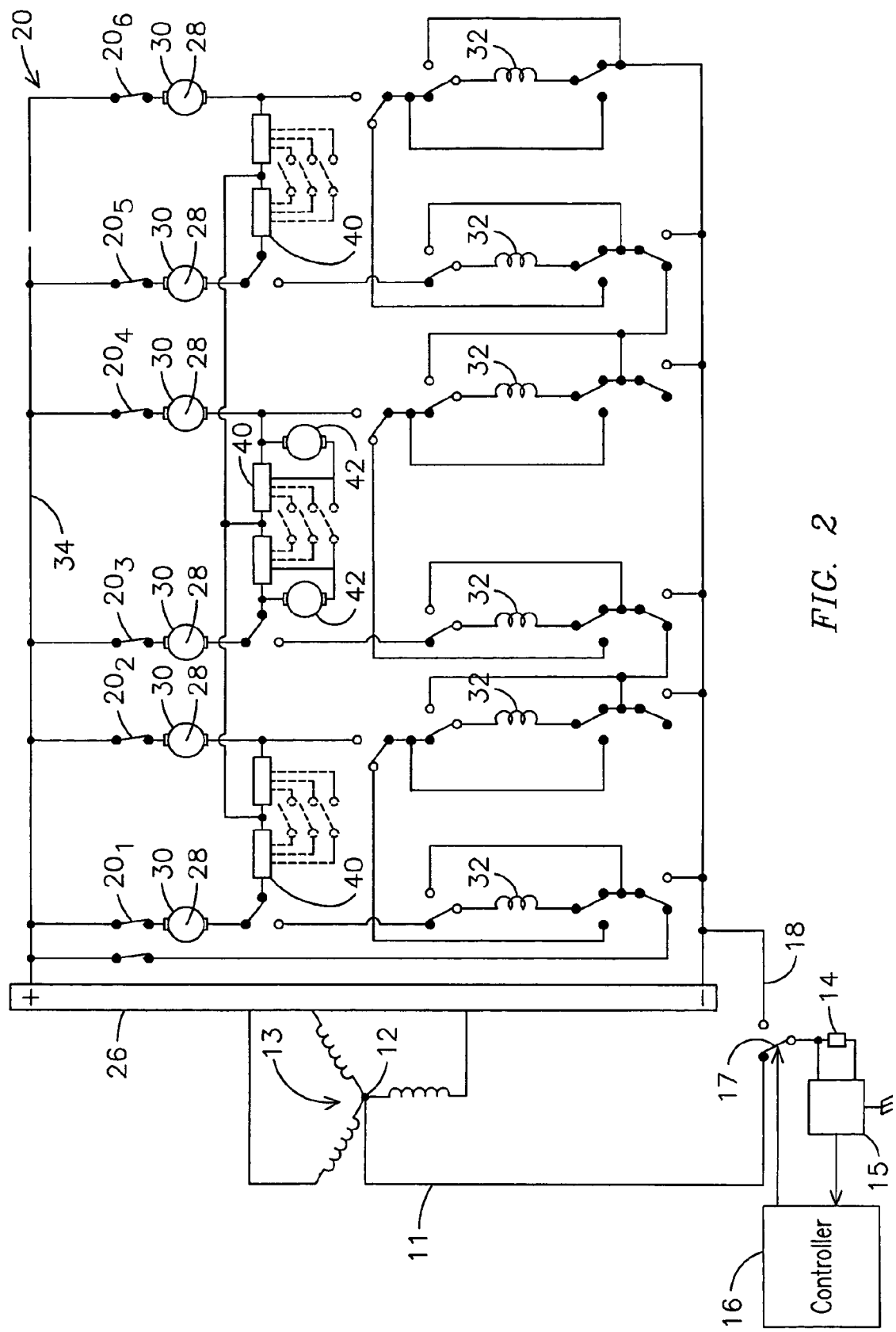
FIG. 2 illustrates the electrical propulsion system of FIG. 1 exemplarily configured to operate in a "dynamic braking" mode.

FIG. 2 illustrates the exemplary propulsion system embodiment of FIG. 1, except that the contactors and associated switchgear are shown in a "dynamic braking" configuration. Accordingly, aspects of the present invention may be used regardless of the mode of operation of the propulsion system, e.g., motoring, dynamic braking and self-load. As will be understood by one skilled in the art, self-load refers to a test mode wherein the traction system is operated without causing locomotive motion. That is, generated electrical power is dissipated in the power resistor grids in lieu of being used for driving the traction motors of the locomotive.

Figure 3:
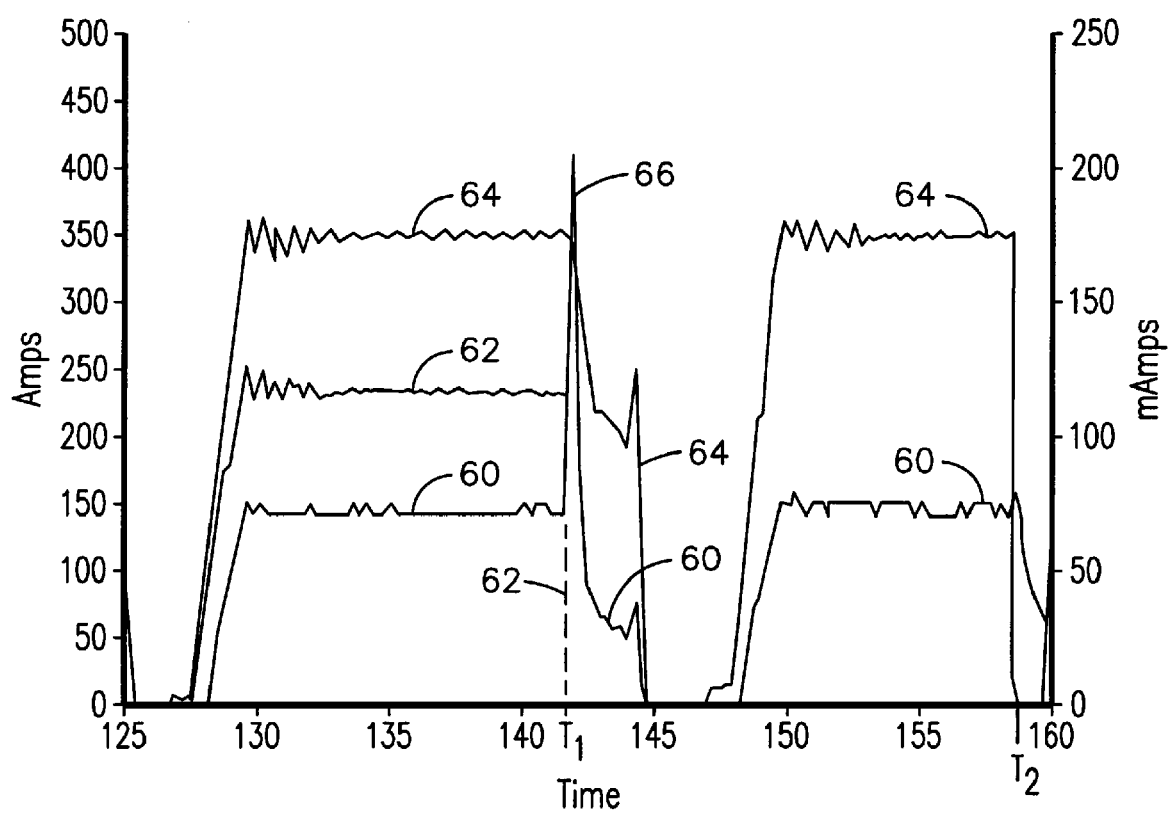
FIG. 3 is a plot of exemplary test signals that can exhibit identifiable characteristics that may be used for associating an incipient ground fault with a particular traction motor of a locomotive.

FIG. 3 is a plot of exemplary test signals that may be used for describing the concepts that allow associating an incipient ground fault with a particular traction motor. Signal 60 represents leakage current, signal 62 represents a test signal associated with a traction motor experiencing an incipient ground fault condition, and signal 64 represents a test signal associated with a traction motor free of any ground fault. At time $T_1$, the contactor associated with the traction motor with the incipient ground fault is set to the open condition. At time $T_2$, the contactor associated with the traction motor free of any ground fault is set to the open condition. Compare the substantial spike 66 that develops in the leakage current, essentially at time $T_1$, due to the contactor-induced transient versus the lack of any spike in the leakage current after time $T_2$.

Assuming that setting contactor $20_1$ to an open condition does not cause a transient signal response in the leakage current, then the test sequence can be continued for the remaining traction motors. For example, one can then set contactor $20_2$ to an open condition, and monitor the resulting transient signal response in the leakage current. In the event, one detects the transient signal response (e.g., spike) in the leakage current, an appropriate fault may be logged in memory against the particular traction motor. This information may be retrieved at a later time by a service person and will allow the service person to focus on the particular traction motor. This can save considerable troubleshooting time since the service person can focus his/her attention on a single traction motor, as opposed to dealing with multiple traction motors.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A method for detecting and performing diagnostics in connection with an incipient ground fault that may occur in an electrical propulsion system of a traction vehicle, said method comprising:
   providing a first ground connection for said electrical propulsion system, said first ground connection forming a grounding path generally used by said electrical propulsion system during normal operation;
   providing a second ground connection for said electrical propulsion system, said second ground connection forming a grounding path selectively usable in lieu of said first ground connection;
   defining a control strategy for switching between the first ground connection and the second ground connection;
   monitoring a respective leakage current associated with at least one of said first and second ground connections; and
   controlling switching between said first and second ground connections based on the monitored leakage current associated with at least one of said first and second ground connections, wherein said switching disconnects a ground connection associated with the leakage current.

2. The method of claim 1 wherein the control strategy comprises:
   monitoring a level of leakage current associated with said first ground connection; and
   relating the monitored level of leakage current to a predefined leakage current limit, wherein a current level in excess of said leakage current limit is indicative of an incipient ground fault in the electrical propulsion system.

3. The method of claim 2 wherein in the event the level of leakage current exceeds the leakage current limit, said method further comprising switching to the second ground connection, said second ground connection configured to form a grounding path at a lower voltage than the grounding path formed by the first ground connection, thereby avoiding the potential escalation of said incipient ground fault into a vehicle-disabling condition.

4. The method of claim 3 wherein in the event the level of leakage current returns below the leakage current limit at least for a predefined period of time, a switching back to the first ground connection is made.

5. The method of claim 1 wherein said electrical propulsion system comprises a generator and the method further comprises providing the first ground connection at an electrically-neutral node of said generator.

6. The method of claim 5 wherein said electrical propulsion system comprises a rectifier electrically coupled to receive AC voltage from said generator and to output a DC voltage to a DC bus comprising a first voltage rail and a second voltage rail each carrying a different voltage, each of said first and second voltage rails respectively connected to at least one or more traction motors of said propulsion system, and wherein the method further comprises providing the second ground connection at one of the first and second voltage rails of said DC bus.

7. The method of claim 6 wherein said electrical propulsion system further comprises a plurality of contactors that may be respectively set either in an electrically-closed condition or in electrically open condition, when in the closed condition a respective one of said contactors being electrically coupled in circuit series with a respective one of the traction motors to receive voltage from said DC bus, and wherein the method further comprises, setting the respective contactor to an open condition, monitoring a resulting transient signal response in the leakage current, and determining whether the monitored transient signal response is indicative of the presence of the incipient ground fault in connection with said respective one of the traction motors.

8. The method of claim 7 further comprising returning said respective one of the contactors to the closed condition and setting another one of the respective contactors to the open condition, said another contactor electrically coupled with another one of the traction motors when in the closed condition, monitoring a resulting transient signal response in the leakage current, and determining whether said last-recited transient signal response is indicative of the presence of the incipient ground fault in connection with said another one of the traction motors.

9. The method of claim 7 wherein, upon detecting a transient signal response that is indicative of the presence of the incipient ground fault in connection with a respective one of the traction motors, logging in a memory the respective one of the traction motors determined to be associated with the incipient ground fault.

10. The method of claim 1 wherein the control strategy comprises periodically switching from the first ground connection to the second ground connection even in the absence of any excess in a current leakage associated with said first ground connection, said periodic switching configured to detect an incipient ground fault located in a location that otherwise constitutes an electrically blind location for detecting incipient ground faults that occur at the electrically blind location.

* * * * *